United States Patent
Shlomai

(10) Patent No.: US 8,332,940 B2
(45) Date of Patent: Dec. 11, 2012

(54) TECHNIQUES FOR SECURING A COMPUTING ENVIRONMENT

(75) Inventor: Netzer Shlomai, Ra'anana (IL)

(73) Assignee: Installfree, Inc., Stamford, CT (US)

( * ) Notice: Subject to any disclaimer, the term of this patent is extended or adjusted under 35 U.S.C. 154(b) by 1038 days.

(21) Appl. No.: 11/697,702

(22) Filed: Apr. 6, 2007

(65) Prior Publication Data

US 2007/0239983 A1    Oct. 11, 2007

Related U.S. Application Data

(60) Provisional application No. 60/744,598, filed on Apr. 11, 2006.

(51) Int. Cl.
*G06F 21/00* (2006.01)
(52) U.S. Cl. .................................. 726/22; 713/164
(58) Field of Classification Search .................. None
See application file for complete search history.

(56) References Cited

U.S. PATENT DOCUMENTS

| | | | |
|---|---|---|---|
| 6,851,112 B1 * | 2/2005 | Chapman | 718/1 |
| 7,370,360 B2 * | 5/2008 | van der Made | 726/24 |
| 7,865,893 B1 * | 1/2011 | Omelyanchuk et al. | 718/1 |
| 2003/0056107 A1 * | 3/2003 | Cammack et al. | 713/189 |
| 2004/0025158 A1 * | 2/2004 | Traut | 718/1 |
| 2005/0076326 A1 * | 4/2005 | McMillan et al. | 717/100 |
| 2005/0114643 A1 | 5/2005 | Bryant-Rich et al. | |
| 2005/0246718 A1 * | 11/2005 | Erlingsson et al. | 719/317 |
| 2006/0070069 A1 * | 3/2006 | Aguilar et al. | 718/100 |
| 2006/0130060 A1 * | 6/2006 | Anderson et al. | 718/1 |
| 2006/0136720 A1 * | 6/2006 | Armstrong et al. | 713/164 |
| 2007/0050765 A1 * | 3/2007 | Geisinger | 718/1 |
| 2007/0050770 A1 * | 3/2007 | Geisinger | 718/100 |
| 2007/0283324 A1 * | 12/2007 | Geisinger | 717/120 |
| 2009/0187750 A1 * | 7/2009 | Bugnion | 712/244 |

* cited by examiner

*Primary Examiner* — David Pearson
(74) *Attorney, Agent, or Firm* — Myers Wolin, LLC

(57) ABSTRACT

Techniques for securing a computing environment are disclosed. Specifically, the invention allows the execution of any software application with administrator permissions on any computing device. This is done while preventing any of the software applications executed by the users, to perform harmful operations on the device. To this end, a user having only guest access permissions is allowed to perform operations as if the user has administrator permissions.

16 Claims, 4 Drawing Sheets

TECHNIQUES FOR SECURING A COMPUTING ENVIRONMENT

CROSS-REFERENCE TO RELATED APPLICATIONS

This application claims the benefit of U.S. Provisional Application 60/744,598 filed on Apr. 11, 2006, which is incorporated herein by reference in its entirety.

TECHNICAL FIELD

The present invention relates generally to the execution of software applications, and more particularly to a method for executing software applications in a secured environment.

BACKGROUND OF THE INVENTION

Personal computers (PCs) serve a multitude of software applications, features and functions. The applications provide the user with tools to accomplish tasks, such as, but not limited to, document processing, spreadsheet management, email exchanges and Internet browsing. The features and functions are commonly referred to as the "personalized information" and may comprise favorite Internet websites, contacts, Internet cookies, digital signatures, background images, desktop icons, application control bars, choice of default values and other configurable settings. In general, the personalized information differs from one user to another.

Typically, software applications are installed and setup using an automated installation process. The installation process is designed to enable the integration of the new functionality into the overall computing environment and organization of the operating system (OS), as well as ensuring that the application can be safely removed. Installation and setup of software applications can be typically performed by user accounts that have administrative rights.

To secure a computing environment from performing harmful operations by applications or users, different permission levels are defined. Generally, there are two permission levels: guest and administrator. The guest permissions allow users only to run applications, but not to install applications or change applications' settings. The administrator permissions allow the user to install applications and hardware, make system-wide changes, access and read all non-private files, create and delete user accounts, define accounts' permissions, and so on.

One security approach that utilizes the permission system is known as "a locked-down computer". This is a computer that is being operated by a user account or process that does not have full administrator permissions. This approach has been proven to be secure, but at the same time limits the users productivity as the user cannot independently install any plug-in or application. Every such installation must be made only by users who have administrative privileges, e.g., the information technology (IT) personnel.

Another security approach includes running applications in a "protected environment". That is, users can operate with administrator permissions, but harmful operations are monitored and blocked. The drawback of this approach is that the number of operations or combinations of operations that can be harmful to the computer is almost infinite. Thus, such operations can be difficult to monitor limiting the ability to provide a secure environment.

Therefore, it would be highly desirable to provide a solution that allows a user to run his common applications with administrator permissions while preventing a security breach.

SUMMARY OF THE INVENTION

The present invention includes techniques for securing a computing environment. Specifically, the invention allows the execution of a software application with administrator permissions on any computing device. This is done while preventing any of the software applications executed by the users, to perform harmful operations on the computing device. To this end, a user having only guest access permissions on the computing device is allowed to perform operations as if the user has administrator permissions.

The present invention includes a method executing a software application having administrator permissions in a secured environment. The method includes executing the software application over a host operating system configured with guest permissions; and simulating administrator permissions for the software application execution.

In another embodiment a virtual operating system adapted for enabling the execution of a software application having administrator permissions in a secured environment includes a virtual security permission manager (VSPM) for handling security system calls generated by the software application; and a virtual service manager (VSCM) for handling services requests generated by the software application.

DETAILED DESCRIPTION OF THE INVENTION

Figure 1:
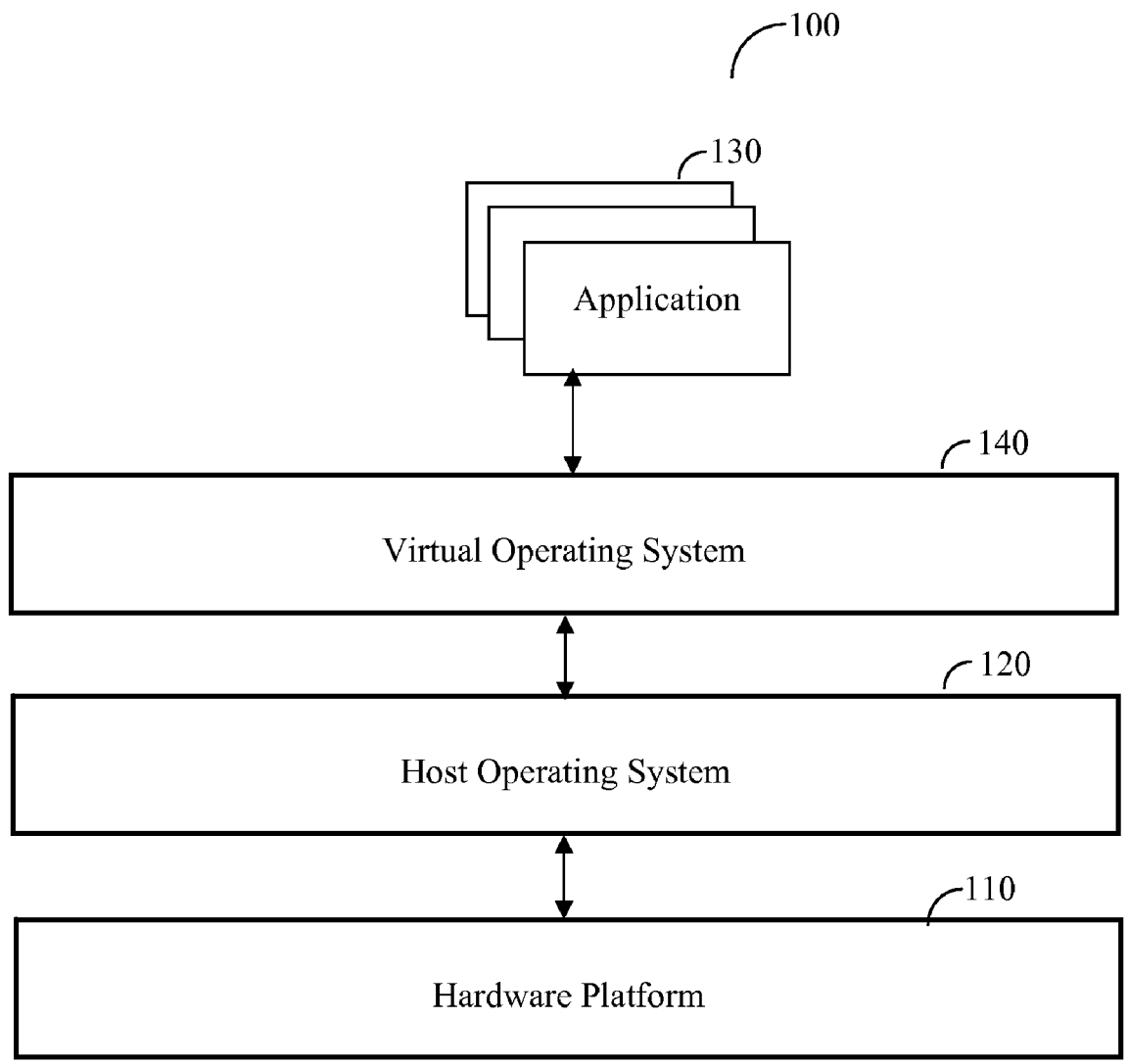
FIG. 1—is computer system architecture used for describing the principles of the present invention.

FIG. 1 shows an exemplary and non-limiting diagram of hardware and software components of a computing device 100 used for describing the principles of the present invention. Computing device 100 may be, but is not limited to, a desktop, a notebook, a personal digital assistant (PDA), a cellular phone, a networked device, and the likes. The computing device 100 comprises a hardware platform 110 that includes a plurality of hardware components that can be found in any computing device. These components may be, but are not limited to, a central processing unit (CPU), a system memory, a storage disk, a system board, a network interface card (NIC), a display adapter, and so on.

At the system level of the computing device 100, a host operating system (HOS) 120 is installed. The HOS 120 has a direct access to the hardware resource of the hardware platform 110 usually using drivers installed within the HOS 120. The HOS 120 operates at the most privileged permission level. The HOS 120 may be any type of operating system, such as, Windows® XP, Windows Vista™, Windows server, Linux™, a UNIX-like operating system, and the likes.

The HOS 120 executes a plurality of applications 130, such as document processing, spreadsheet management, email exchanges, Internet browsing, media players, add-ons, and operating system shells. In addition, a virtual operating system (VOS) 140 is run on the computing device 100. The VOS 140 is capable of executing one or more applications 130 in a virtual environment. That is, the VOS 140 acts as an interface between the HOS 120 and the applications 130. The operation of the VOS 140 is described in greater detail below.

In accordance with an embodiment of the present invention, the applications 130 and VOS 140 are part of a portable platform. In another embodiment, a plurality of VOSs 140 are operated on the computing device 100, each of which is coupled to an application 130. A pair of applications 130 and VOS 140 are encapsulated in a software package. The portable platform and/or software package can be stored, and executed from for example, a portable memory device, a portable storage device, or a web site.

The VOS 140 provides a security layer in addition to those provided by the HOS 120. Specifically, the HOS 120 is executed with guest permissions, i.e., the computer is being operated by a user account or process that does not have full administrator permissions. However, at the same time, the VOS 140 enables the execution of applications 130 with administrator permissions. That is, the VOS 140 simulates administrator permissions to operations performed by the applications 130. Therefore, harmful operations can be blocked either by the VOS 140 or by the HOS 120. If an application breaches the security layer provided by the VOS 140, the application will be blocked by the HOS 120. This is achieved due to the fact that the HOS 120 runs with guest permissions and simulating administrator permissions to the application does not change the permission level of the HOS 120. The harmful operations may include unauthorized changes or modifications to the HOS 120.

Figure 2:
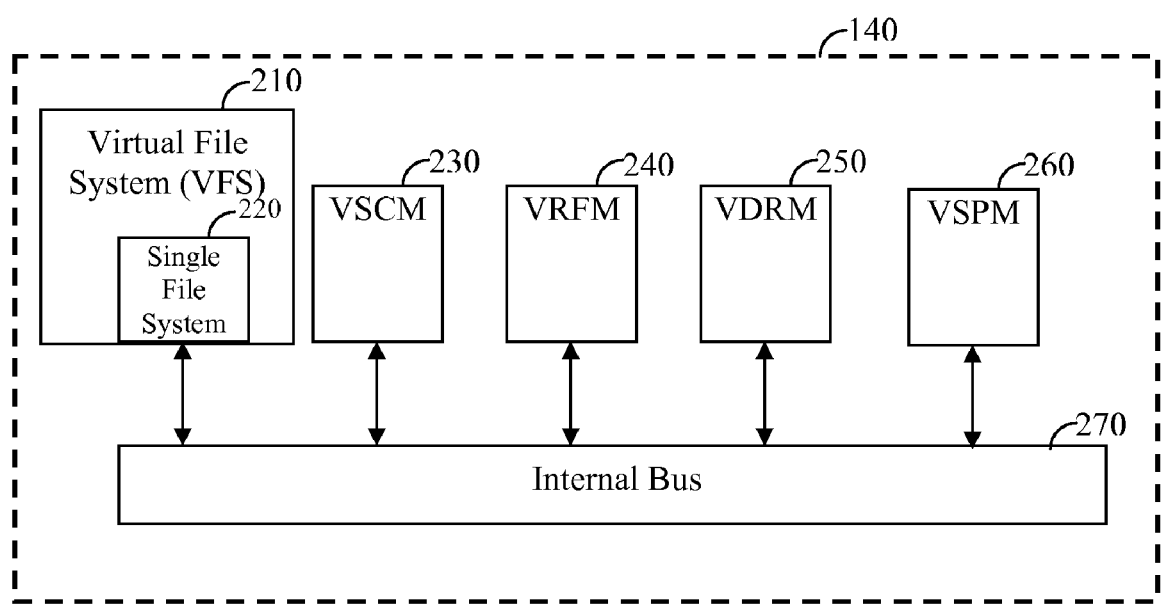
FIG. 2—is a functional diagram of a virtual operating system (VOS) disclosed in accordance with an exemplary embodiment of the present invention.

FIG. 2 shows a non-limiting and exemplary functional diagram of the VOS 140 in accordance with an embodiment of the present invention. The VOS 140 includes a virtual file system (VFS) 210, a single file system 220, a virtual service manager (VSCM) 230, a virtual registry file manager (VRFM) 240, a virtual digital rights management (VDRM) 250, and a virtual security permission manager (VSPM) 260. Virtual file system 210, VSCM 230, VRFM 240, VDRM 250, and VSPM 260 communicate with each other via internal bus 270.

The VFS 210 interfaces between the HOS 220 and the VOS 140. That is, the VFS 210 captures all user-mode system calls of the HOS 220 and distributes each system call to a specific component of VOS 140 that can handle it. The VFS 210 further receives the processing results from the components of the VOS 140 and sends them back to the HOS 120.

The single file system 220 translates a set of file system commands of the HOS 120 to a set of commands that can be executed by applications 130 in a user-mode (e.g., USER-32 in Windows). These commands may include, but are not limited to, write, read, seek, remove, and the likes. Once the single file system 220 completes the execution of the commands, it returns the processing results to the VFS 210.

The VSCM 230 captures all requests made to the services by an application and creates virtual services to be used during execution of the application in the current virtual environment. Services behave differently from executable applications. Typically, services are shared, run and created only with administrative permission levels, start at the computer computing device's startup, and must be registered in the system registry file. When an executed application requests a service, the VSCM 230 allocates and runs the requested service. The process for executing a service with administrative permission levels, when both the HOS 120 and VOS 140 are running in a guest permission level, is described in greater detail below.

The VRFM 240 captures all requests made to the registry file by applications 130 and decides, for each such request, whether it should be directed to system registry file stored in the computing device 200 or to virtual registry files. The VDRM 250 includes the unique hardware signature of the virtual environment; such signature is created when the VOS 140 is initialized. The hardware signature is usually required for the execution of the applications 130. The signature may include, but is not limited to, a network map, a device serial ID, a user name, a user ClassID, or any combination thereof.

The VSPM 260 simulates administrator permissions for the applications 130. Specifically, the VSPM 260 captures all security system calls, processes these calls, and returns results as if the VOS 140 and HOS 120 are operating with administrator permissions. The operation of VSPM 360 is further described below.

Figure 3:
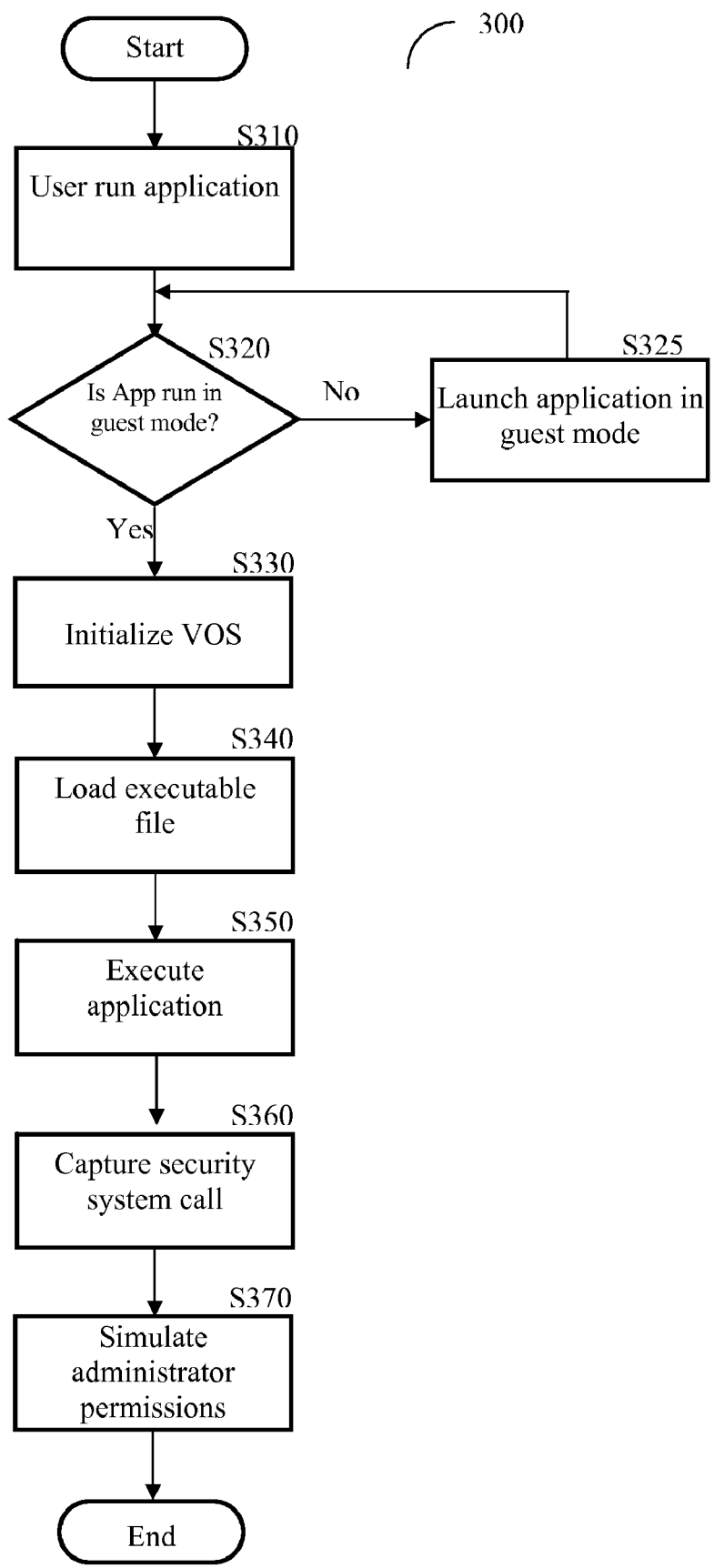
FIG. 3—is a flowchart describing the process for executing software applications in a secured environment in a virtual environment.

FIG. 3 shows an exemplary and non-limiting flowchart 300 describing the process for executing software applications in a secured virtual environment, in accordance with an embodiment of the present invention. The applications are executed on a HOS 120 having guest access permissions but allowed to performed administrative tasks. As mentioned above, an application is executed by the VOS 140, thereby operating in a sealed environment that is completely isolated from the HOS 120 and from other applications. However, if the application penetrates the security layer provided by the VOS 140, no harmful operations can be performed on the computing device, as such operations will be blocked by the HOS 120 which allows only guest mode operations. The operations requiring administrator permissions are executed by the VOS 140.

At S310 a user executes one of the applications 130. At S320, it is checked if the application has guest permissions, and if so execution continues with S330; otherwise, execution continues with S325 where the application is launched with guest permissions. That is, each and every application executed by the VOS 140 does not have administrator permissions. At S330, the VOS is initialized, and at S340, the registry files, services and executable files of the application are loaded. Thereafter, at S350, the application is run using the VOS as described in greater detail above. At S360, while running the application, security related system calls are captured by the VSPM 260, and then at S370 these system calls are processed as the application runs in an administrator account. Specifically, the VSPM 260 sends the system call to be executed by the HOS 220 (i.e., by the kernel) and adds to the returned results administrator information.

Figure 4:
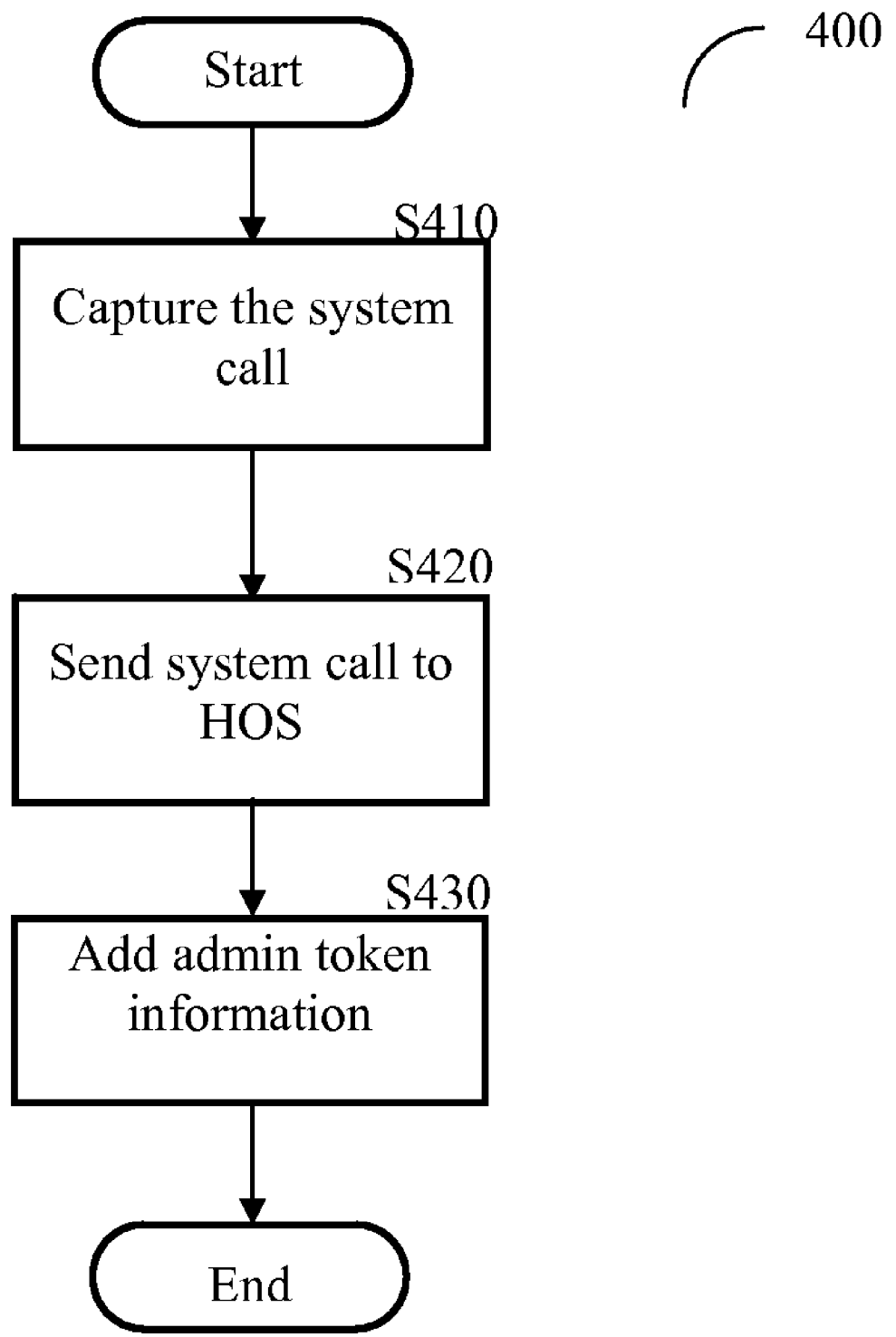
FIG. 4—is a flowchart describing the processes for handling security system calls by the VOS.

FIG. 4, shows an exemplary flowchart 400 for handling the system call "GetTokenInformation" executed by the VSPM 260. This is a security system call that retrieves a specified type of information about an access token. An access token contains the security information for a logon session. An OS creates an access token when a user logs on, and every process executed on behalf of the user has a copy of the token. The token identifies the user, the user's groups, and the user's privileges. The OS uses the token to control access to securable objects and to control the ability of the user to perform various system-related operations on the host computer. At S410, a GetTokenInformation system call is captured by the VOS 140. At S420, the system call is sent to the HOS 120 to be processed. The HOS 120 returns a result that includes an access token and users and/or group of users associated with this token. The results are returned to the VSPM 260, which at S430 adds administrator token information to the results.

When an application is executed it may request to run a service. Services are opened and created with full privilege permissions, however, the application runs in a guest account. Therefore, when the application requests to open a service, the VOS 140 captures the request and returns a fake handle. Using the fake handle a virtual service is created, which can be then executed by the VSCM 320 without privilege permissions. It should be noted that the virtual services executed by the VSCM 320 have the necessary privileges.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device, embodied on a program storage unit or computer readable medium or downloaded from the Internet. Most preferably, the principles of the present invention are implemented as a combination of hardware and software. The computer executable code may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

It is to be further understood that, because some of the constituent system components and methods depicted in the accompanying drawings may be implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for executing a software application having administrator permissions in a secured environment, comprising:

executing the software application over a host operating system configured with guest permissions by checking whether the permissions level set for the software application is administrator permissions and launching the software application in a virtual operating system (VOS) with quest permissions if the software application is set for administrator permissions;

simulating administrator permissions for operations performed by the software application in the VOS by processing security system calls generated by the software application in the host operating system, wherein the simulation of administrator permissions does not change the guest permissions set for the host operating system; and blocking, by the VOS, harmful operations performed by the software application; and blocking, by the host operating system, harmful operations performed by the software application from being executed in the host operating system, if such operations breached the VOS.

2. The method of claim 1, wherein simulating the administrator permissions further comprising:

handling security system calls generated by the software application; and handling services' requests generated by the software application.

3. The method of claim 2, wherein processing the security system calls further comprising:

capturing the security system calls;

sending the security system calls to the host operating system; and adding administrator information to processing results returned by the host operating system.

4. The method of claim 3, wherein the services' requests are handled by virtual services.

5. The method of claim 1, wherein the VOS enables the execution of the software application over the host operating system.

6. The method of claim 1, wherein the VOS comprises at least:
- a virtual security permission manager (VSPM) for handling security system calls generated by the software application; and
- a virtual service manager (VSCM) for handling services' requests generated by the software application.

7. The method of claim 6, wherein the VOS further comprises:
- a virtual file system (VFS) for interfacing between the operating system (OS) running on a computing device and the VOS;
- a single file system for translating a set of file system commands of the computing device to a set of commands to be executed by the VOS;
- a virtual service manager (VSCM) for generating a virtual environment for the execution of services requested by the software application;
- a virtual registry file manager (VRFM) for handling registry file requests; and
- a virtual digital rights management (VDRM).

8. The method of claim 1, wherein the host operating system comprises any one of: a DOS based operation system and an open-source based operating system.

9. A non-transitory computer readable medium having stored thereon instructions for causing a computer to perform a method securing for executing a software application having administrator permissions in a secured environment, comprising:
- executing the software application over a host operating system configured with guest permissions by checking whether the permissions level set for the software application is administrator permissions and launching the software application in a virtual operating system (VOS) with guest permissions if the software application is set for administrator permissions;
- simulating administrator permissions for the software application by VOS by processing security system calls generated by the software application in the host operating system, wherein the simulation of administrator permissions does not change guest permissions set for the host operating system;
- blocking by the VOS harmful operations performed by the software application; and
- blocking, by the host operating system, harmful operations performed by the software application from being executed in the host operating system if such operations breached the VOS.

10. The non-transitory computer readable medium of claim 9, wherein simulating the administrator permissions further comprising:
- handling security system calls generated by the software application; and
- handling services' requests generated by the software application.

11. The non-transitory computer readable medium of claim 10, wherein handling the security system calls further comprising:
- capturing the security system calls;
- sending the security system calls to the host operating system; and
- adding administrator information to processing results returned by the host operating system.

12. The non-transitory computer readable medium of claim 11, wherein the services' requests are handled by virtual services.

13. The non-transitory computer readable medium of claim 9, wherein the VOS enables the execution of the software application over the host operating system.

14. The non-transitory computer readable medium of claim 9, wherein the VOS comprises at least:
- a virtual security permission manager (VSPM) for the handling security system calls generated by the software application; and
- a virtual service manager (VSCM) for handling the services' requests generated by the software application.

15. The non-transitory computer readable medium of claim 14, wherein the VOS further comprises:
- a virtual file system (VFS) for interfacing between the operating system (OS) running on a computing device and the VOS;
- a single file system for translating a set of file system commands of the computing device to a set of commands to be executed by the VOS;
- a virtual service manager (VSCM) for generating a virtual environment for the execution of services requested by the software application;
- a virtual registry file manager (VRFM) for handling registry file requests; and
- a virtual digital rights management (VDRM).

16. The non-transitory computer readable medium of claim 9, wherein the host operating system comprises at any one of: a DOS based operating system and an open-source based operating system.

* * * * *